Patented Mar. 4, 1952

2,588,294

UNITED STATES PATENT OFFICE 2,588,294

PROCESS FOR THE PRODUCTION OF 17-HYDROXYSTEROIDS

George Rosenkranz and Stephen Kaufmann, Mexico City, Mexico, assignors to Syntex, S. A., Mexico City, Mexico, a corporation of Mexico No Drawing. Application March 24, 1948, Serial No. 16,886

7 Claims. (Cl. 260—397.5)

The present invention relates to a process for the production of 17 hydroxysteroids. More particularly the present invention relates to a process for the conversion of 17 ketosteroids to 17 hydroxysteroids by the addition of lithium aluminum hydride (LiAlH$_4$) to the carbonyl and subsequent hydrolysis of the metal alcoholate complex formed.

Although various methods have been proposed for the conversion of keto groups to hydroxy groups in general and some of them have been used for the conversion of 17 ketosteroids to 17 hydroxysteroids, these methods have not been especially satisfactory. The prior art methods, for example, have involved the hazardous use of relatively large quantities of sodium and/or resulted in the production of the "cis" or biologically inactive isomer. Further, some of the methods proposed were unsatisfactory where the compounds reacted on were unsaturated.

The reaction according to the present invention has been found to give 17 hydroxysteroids of predominantly "trans" isomerism and very little of the "cis" isomer is formed. The trans isomer is most biologically active, hence the reaction presents particular advantages for transformation of such steroids as the oestrone, androsterone, and their analogues of varying ring saturation such as dehydro-iso-androsterone, equilenin and equilin and their derivatives. The ring structure may be substituted and particularly to form enol ethers in the 3 position. Such ethers as ethyl, phenyl, cyclohexyl and benzyl are the most usual types.

The reaction may be illustrated by the following general equation:

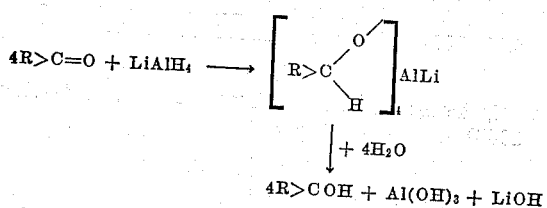

where R is a saturated or unsaturated polyhydro cyclopentanophenanthrene which may be substituted by groups inert to lithium.

In carrying out the present method the 17 ketosteroid is dissolved in an inert dry solvent preferably an ether or mixtures thereof such as dry diethyl ether, dioxan, tetrahydrofuran, etc. added to a similar solution of lithium aluminum hydride and allowed to react at ordinary or slightly raised temperatures under gentle reflux for a short time.

The reaction mixture is then cooled, water may be added to destroy excess lithium aluminum hydride, and the complex lithium aluminum steroid addition product is decomposed with dilute acid, generally mineral acid, such as 10% sulphuric acid, but other acids may be used.

The following specific examples serve to illustrate the present invention but are not intended to limit the same:

Example I

A solution of 15 grams of androstendione-3, 17-enol benzyl ether-3 melting at 164° C. dissolved in absolute ether was slowly added to a solution of 0.5 gr. of lithium aluminum hydride in absolute ether, contained in a reaction vessel bearing an inlet funnel and a reflux condenser, both provided with calcium chloride tubes. The vessel was mounted on a steam bath. The heating and the inlet velocity were regulated in such a way that a gentle reflux was maintained. When all the enolether solution was added refluxing was maintained for 10 minutes. The vessel was then put in an ice bath and water added dropwise and cautiously to destroy the excess hydride. When the hydrogen evolution ceased, more water was added and the whole poured onto 200 cc. of 10% sulphuric acid, and the mixture thoroughly stirred. The ether layer was then washed with water, sodium bicarbonate solution and water to neutrality, dried and evaporated. The residue melting at 153° C. was trans testosterone benzyl 3 enol ether in almost quantitative yield.

Example II

A solution of 15 grams of androstendione 3, 17-cyclohexyl enol ether-3, melting at 164° C. dissolved in absolute ether was slowly added to a solution of 0.5 gram of lithium aluminum hydride in absolute ether, contained in a reaction vessel bearing an inlet funnel and a reflux condenser, both provided with calcium chloride tubes. The vessel was mounted on a steam bath. The heating and the inlet velocity were regulated in such a way that a gentle reflux was maintained. When all the enolether solution was added refluxing was maintained for 10 minutes. The vessel was then put in an ice bath and water added dropwise and cautiously to destroy the excess hydride. When the hydrogen evolution ceased, more water was added and the whole poured onto 200 cc. of 10% sulphuric acid, and the mixture thoroughly stirred. The ether layer was washed with water, sodium bicarbonate solution and water to neutrality, dried and evaporated. The residue melting at 130–131° C. was trans testosterone cyclohexyl 3 enol ether in almost quantitative yield.

*Example III*

A solution of 15 grs. of androstendione-3, 17-enol-ethyl ether-3, in absolute ether was slowly added to a solution of 0.5 gr. of lithium aluminum hydride in absolute ether, contained in a reaction vessel bearing an inlet funnel and a reflux condenser, both provided with calcium chloride tubes. The vessel was mounted on a steam bath. The heating and the inlet velocity were regulated in such a way that a gentle reflux was maintained. When all the enolether solution was added refluxing was maintained for 10 minutes. The vessel was then put in an ice bath and water was added dropwise and cautiously to destroy the excess hydride. When the hydrogen evolution ceased, more water was added, the whole poured onto 200 cc. of 10% sulphuric acid, and the mixture thoroughly stirred. The ether layer was washed with water, sodium bicarbonate solution and water to neutrality, dried and evaporated. The residue, melting between 120° and 122° was trans testosterone-ethyl-3 enol ether in almost quantitative yield.

*Example IV*

A solution of 15 grs. of dehydro-iso-androsterone in absolute ether was reacted with 0.5 gr. of lithium aluminum hydride, and subsequently treated as described in Example III. The residue of the ether evaporation was recrystallized once from ethyl acetate to give androstene-17-trans-diol, melting point 175–178°.

*Example V*

A solution of 1 gr. of oestrone in absolute ether was reacted with 30 mgs. of lithium aluminum hydride and subsequently treated as described in the previous examples. The residue of the ether evaporation was recrystallized once from methanol and once from benzene to give alpha oestradiol, melting point 176–178°.

It will be obvious to those skilled in the art that various changes may be made without departing from the spirit of the invention and therefore the invention is not limited to what is described in the specification but only as indicated in the appended claims.

What is claimed is:

1. In a method for the conversion of the keto group in the 17-position of a cyclopentanopolyhydrophenanthrene group to a

group, wherein the hydroxy group is substantially of the beta configuration, comprising mixing the keto steroid and lithium aluminum hydride to form a complex, hydrolyzing the complex, and isolating the 17-beta-hydroxy steroid.

2. A method for converting androstendione-3-enol ethers to trans testosterone-3-enol ethers comprising reacting the androstendione-3-enol ether with lithium aluminum hydride under anhydrous conditions to form a lithium aluminum derivative of the androstendione-3-enol ether and hydrolizing said derivative.

3. A method for converting androstendione-3,17-enol benzyl ether-3 to trans testosterone benzyl 3 enol ether comprising reacting the androstendione-3,17-enol benzyl ether-3 with lithium aluminum hydride under anhydrous conditions to form a lithium aluminum derivative of the androstendione-3,17-enol benzyl ether-3 and hydrolizing said derivative.

4. A method for converting androstendione-3,17-cyclohexyl enol ether-3 to trans testosterone cyclohexyl 3 enol ether comprising reacting the androstendione-3,17-cyclohexyl enol ether-3 with lithium aluminum hydride under anhydrous conditions to form a lithium aluminum derivative of the androstendione-3,17-cyclohexyl enol ether-3 and hydrolizing said derivative.

5. A method for converting androstendione-3,17-enol-ethyl ether-3 to trans testosterone-3,17-enol-ethyl ether comprising reacting the androstendione - 3,17 - enol-ethyl ether-3 with lithium aluminum hydride under anhydrous conditions to form a lithium aluminum derivative of the androstendione-3,17-enol-ethyl ether-3 and hydrolizing said derivative.

6. A method for converting oestrone to alpha oestradiol comprising reacting the oestrone with lithium aluminum hydride under anhydrous conditions to form a lithium aluminum derivative of oestrone and hydrolizing said derivative.

7. A method for converting dehydro-iso-androsterone to androstene 17-trans-diol, comprising reacting the dehydro-iso-androsterone with lithium aluminum hydride under anhydrous conditions to form a lithium aluminum derivative of dehydro-iso-androsterone and hydrolizing said derivative.

GEORGE ROSENKRANZ.
STEPHEN KAUFMANN.

REFERENCES CITED

The following references are of record in the file of this patent:

UNITED STATES PATENTS

| Number | Name | Date |
|---|---|---|
| 2,208,915 | Weisz | July 23, 1940 |
| 2,294,433 | Westphal | Sept. 1, 1942 |
| 2,330,215 | Hildebrandt | Sept. 28, 1943 |
| 2,363,338 | Koster | Nov. 21, 1944 |

OTHER REFERENCES

Nystrom: Jour. Am. Chem. Soc. 69, 1197–1199 (1947).